United States Patent

Kamberger et al.

Patent Number: 5,776,413
Date of Patent: Jul. 7, 1998

[54] CHEMICAL MODE OF OPERATION OF A WATER/STEAM CYCLE

[75] Inventors: Werner Kamberger, Ober-Ohringen, Switzerland; Erhard Liebig, Ditzingen, Germany

[73] Assignee: Asea Brown Boveri AG, Baden, Switzerland

[21] Appl. No.: 743,181

[22] Filed: Nov. 5, 1996

[30] Foreign Application Priority Data

Nov. 28, 1995 [DE] Germany .................. 195 44 224.5

[51] Int. Cl.$^6$ .............. C23F 11/00; F02C 6/00; F02G 1/00
[52] U.S. Cl. .......... 422/7; 60/39.182; 60/39.53; 122/460; 122/472; 122/488
[58] Field of Search ............ 422/7; 60/39.182, 60/39.53; 122/460, 472, 488; 203/10

[56] References Cited

U.S. PATENT DOCUMENTS

| | | | |
|---|---|---|---|
| 2,727,069 | 12/1955 | Van Waes | 260/55 |
| 2,947,686 | 8/1960 | Phillips, Jr. | 208/340 |
| 3,162,550 | 12/1964 | Dvoracek et al. | 148/6.14 |
| 3,415,692 | 12/1968 | Armentano | 148/6.14 |
| 4,031,404 | 6/1977 | Martz et al. | 290/40 R |
| 4,099,374 | 7/1978 | Foster-Pegg | 60/39.12 |
| 4,693,213 | 9/1987 | Yanai et al. | 122/7 R |
| 4,758,311 | 7/1988 | Pagani et al. | |

FOREIGN PATENT DOCUMENTS

| | | |
|---|---|---|
| 3627344A1 | 2/1988 | Germany . |
| 3635411A1 | 4/1988 | Germany . |
| 3724947A1 | 2/1989 | Germany . |
| 2281742 | 3/1995 | United Kingdom . |

*Primary Examiner*—Nina Bhat
*Attorney, Agent, or Firm*—Burns, Doane, Swecker & Mathis, L.L.P.

[57] ABSTRACT

A multi-pressure waste-heat boiler (7) comprises at least one circulation steam generator, having a low-pressure economizer (15), a low-pressure drum (17) and a low-pressure evaporator (16), and at least one once-through steam generator having a high-pressure economizer (21), a high-pressure evaporator (22) and a high-pressure superheater (23). An oxygen addition (32) is arranged between the steam drum (17) of the circulation steam generator and the high-pressure economizer (21) of the once-through steam generator. An ammonia addition (31) is arranged in the feed line (33) leading to the circulation steam generator.

2 Claims, 1 Drawing Sheet

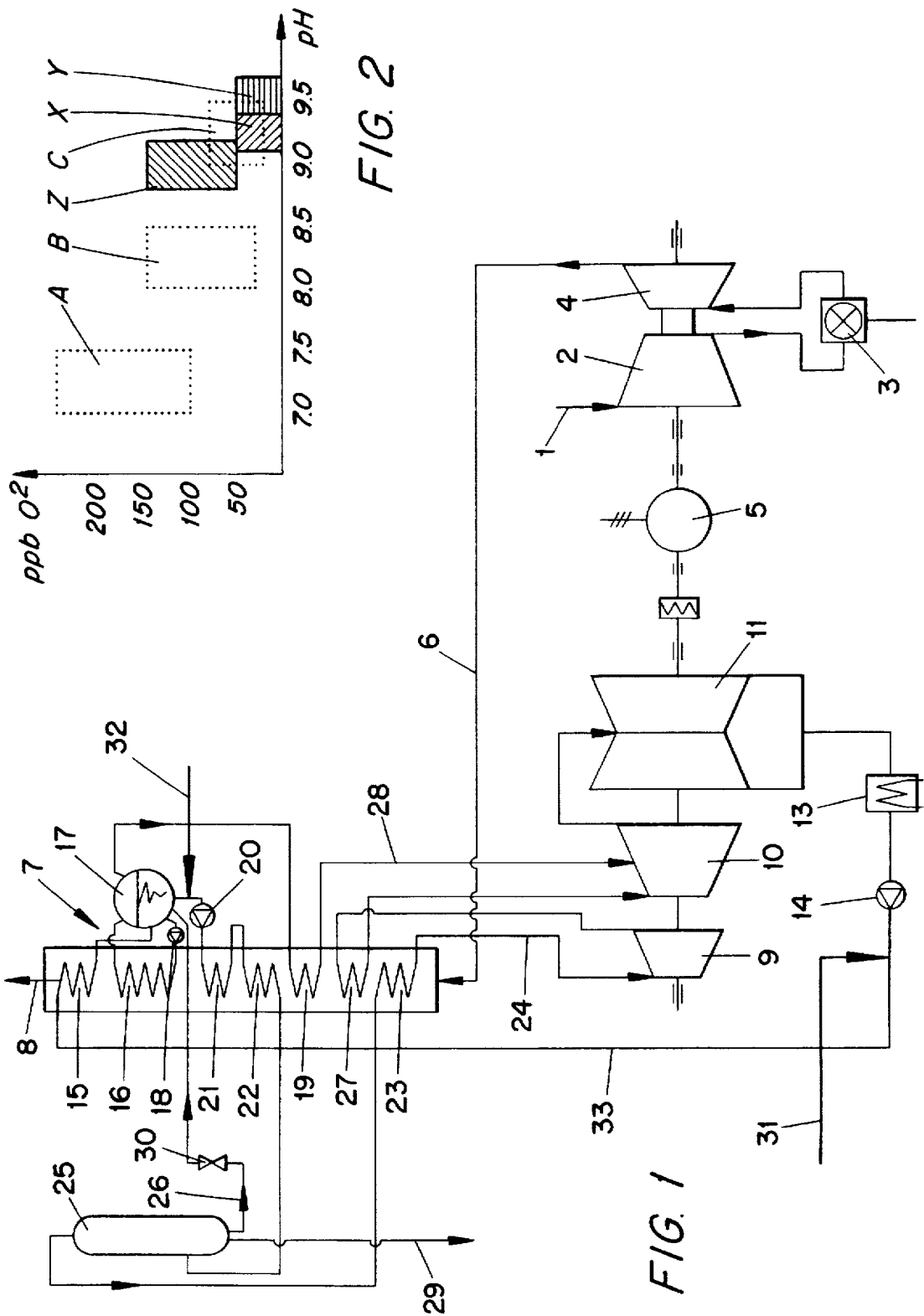

5,776,413

1

CHEMICAL MODE OF OPERATION OF A WATER/STEAM CYCLE

BACKGROUND OF THE INVENTION

1. Field of the Invention

The invention relates to a multi-pressure waste-heat boiler having at least one circulation steam generator, essentially comprising a low-pressure economizer, a low-pressure drum and a low-pressure evaporator, and at least one once-through steam generator, essentially comprising a high-pressure economizer, a high-pressure evaporator and a high-pressure superheater. It also relates to a method of operating such a plant.

2. Discussion of Background

Waste-heat boilers for utilizing the waste heat of energy or process plants producing hot gas are designed either as circulation boilers with drum or else as once-through forced-flow boilers. The chemical mode of operation corresponds to the conventional specifications for conventional steam-generating plants (e.g. TRD 611, VGB-R 450 L, EPRI Guidelines). The alkaline mode of operation, the neutral mode of operation and the combined mode of operation, as used without exception, are briefly explained in FIG. 2 to be described later. Problems arise if a waste-heat boiler is equipped with a circulation low-pressure system and a once-through high-pressure system. If, for example, the conventional alkaline mode of operation is used, the ammonia, on account of its different solubility in steam and water, increases in concentration in the steam region of the low-pressure drum. Inside the drum, the ammonia content is then disproportionately high in the steam and accordingly too low in the water. If the once-through steam generator is now fed with water from the low-pressure drum, its exchange surfaces are insufficiently protected against corrosion and sediments, since no optimum oxide protection film can build up.

SUMMARY OF THE INVENTION

Accordingly, one object of the invention is to provide a novel plant and an operating method of the type mentioned at the beginning in which all parts of the plant can be protected against corrosion and the formation of sediments.

This is achieved according to the invention in that an oxygen addition is arranged between the low-pressure drum of the circulation steam generator and the high-pressure economizer of the once-through steam generator, and in that an ammonia addition is arranged in the condensate line leading to the circulation steam generator.

A method of operating such a plant is distinguished by the fact that so much ammonia solution is added in a dosed quantity to the condensate, which has a pH value between 8.8 and 9.4, that a pH value between 9.4 and 9.7 is reached in the steam phase of the low-pressure drum, and in that so much gaseous oxygen is introduced into the water flowing to the once-through steam generator that its oxygen content ranges between 50 and 150 ppb at a pH value between 8.8 and 9.2.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings FIG. 1 is a schematic representation of a combined gas/steam power station plant,

2

FIG. 2 is a graph showing oxygen concentration versus ammonia concentration of condensate X, steam Y, and high pressure feedwater Z for the method of the invention in comparison with conventional methods.

DESCRIPTION OF THE PREFERRED EMBODIMENTS

Referring now to the drawings, wherein like reference numerals designate identical or corresponding parts throughout the several views, only the elements required for understanding the invention are shown, and the direction of flow of the working media is shown by arrows, in FIG. 1 fresh air drawn in via a line 1 is compressed in a compressor 2 to the working pressure in the gas-turbine system. The compressed air is greatly heated in a combustion chamber 3, fired for example with natural gas, and the fuel gas thus developed is expanded in a gas turbine 4 to perform work. The energy obtained in the process is delivered to a generator 5 or the compressor 2. The still hot exhaust gas from the gas turbine is fed via a line 6 from the outlet of the gas turbine to a waste-heat steam-generating plant 7 and is passed from there, after delivery of its heat, into the open via a line 8 and a flue (not shown).

In the water/steam cycle, a three-stage steam turbine 9, 10 and 11 is arranged on the same shaft as the gas turbine. The working steam expanded in the low-pressure turbine 11 condenses in a condenser 13. The condensate is delivered directly into the steam generator 7 by means of a condensate pump 14. It is remarkable that the plant has no low-pressure preheaters, feedwater tanks and high-pressure preheaters heated as a rule by bleed steam.

The waste-heat steam-generating plant 7 is constructed as an upright boiler and in the present case works according to a dual-pressure steam process. Of course, a horizontal boiler could also be used.

The low-pressure system is constructed as a circulation system with drum, in which case a forced circulation system has been selected here. In the fluegas path of the boiler, it consists of a low-pressure economizer 15 into which the condensate is directed, a low-pressure evaporator 16, and a low-pressure superheater 19. The low-pressure evaporator is connected to a drum 17 via a circulating pump 18. The superheated steam is transferred via a low-pressure steam line 28 into a suitable stage of the intermediate-pressure steam turbine 10.

The high-pressure system is constructed as a once-through forced-flow system and can thus be designed for both subcritical and supercritical parameters. In the flue-gas path of the boiler, it essentially comprises the high-pressure economizer 21, the high-pressure evaporator 22 and the high-pressure superheater 23. The working medium is fed to the high-pressure economizer 21 from the low-pressure drum 17 via a high-pressure feedpump 20. In this way, the hitherto conventional feedwater tank can be dispensed with. The superheated steam is transferred via a livesteam line 24 into the high-pressure part 9 of the steam turbine.

For the phase separation, a separator 25 is provided into which the discharge of the high-pressure evaporator 22 leads. At its top end, the separator is connected to the high-pressure superheater 23. At its bottom end, it is additionally provided with a sludge drain line 29. A recirculation line 26 likewise branches off from the bottom end of the separator, which recirculation line 26 contains a shut-off member 30 and leads into the low-pressure drum 17.

After the partial expansion in the high-pressure part 9 of the turbine, the steam is reheated before transfer into the intermediate-pressure turbine 10. In the example, this reheating is effected in heat-exchange surfaces 27 which are arranged in the flue-gas path of the steam generator above the high-pressure superheater 23.

By variation of the pressures and mass flows in the circulation system and in the once-through system, a wide range of combined processes can be covered with such a steam generator.

In the case of the plant working by the variable-pressure method, a boiler having a division of the mass flows in the low-pressure system and the high-pressure system in a ratio of 1:4 or 1:5 is considered to be appropriate.

The steam production starts in the boiler when the respective temperatures of ebullition are reached. The initial steam in the low-pressure system is generated by expansion of recirculated high-pressure saturated water from the separator.

The separator ensures that the high-pressure superheater remains dry at all times during normal operation and steam superheated in good time is available at the boiler outlet.

It is apparent from FIG. 1 that a condensate-purifying plant is dispensed with. Underlying this fact is the idea that the contaminants in the steam/water cycle can be drawn off in the region of the separator. The purifying of the steam/water cycle can be effected at both full load and part load. To this end, the high-pressure system is overfed, i.e. a larger quantity of water than necessary is delivered through the once-through steam generator via the high-pressure feedpump. It goes without saying that the high-pressure feedpump has to be of correspondingly larger design for the extra quantity. The delivered water quantity is set in such a way that wet steam passes into the separator in any case. The contaminants are bound in the water droplets of the water/steam mixture. The water portion of the steam is separated in the separator by suitable means and drawn off via the sludge drain line 29. Of advantage in this method is the fact that contaminants are largely removed from the cycle even after a few passes, i.e. within the shortest time.

According to the invention, measures are now to be taken in order to reduce the susceptibility to corrosion mentioned at the beginning in such boilers, in particular in the once-through steam generator. To this end, a novel chemical mode of operation having the following method steps is selected:

Downstream of the condenser 13, the condensate as a rule has an oxygen content <50 ppb and a pH value between 8.8 and 9.4. So much ammonia solution is now introduced into this condensate by means of a dosing unit that it has a pH value between 9.1 and 9.4 in the feed line to the boiler. The water passes with this value into the low-pressure drum 17 via the low-pressure economizer 15. The result of the different solubility is that the ammonia increases in concentration in the steam. If, for example, the pH value of the water is still 9.25 upon entering the drum, the pH value in the steam increases to about 9.6 as a result of the increase in concentration, whereas the drum water only has a pH value of 9.0. This value is sufficient for the requirements of the LP evaporator, but not for the formation of a proper oxide protection film on the once-through tubing, which is fed with the same drum water. In order to now create ideal protective-film conditions here, so much gaseous oxygen 32 is fed into the feedwater flowing to the high-pressure economizer that an oxygen content between 50 and 150 ppb becomes established.

The apparatus for this method is extremely simple. The oxygen addition 32 may be effected volumetrically directly from oxygen pressure bottles or from an existing oxygen gas network, and the ammonia addition may be effected in the form of diluted ammonia solution by means of dosing pumps.

The novel mode of operation can be recognized in the diagram in FIG. 2. The pH value is plotted on the abscissa and the oxygen content in [ppb] is plotted on the ordinate. The three dotted regions in each case represent the conventional modes of operation mentioned at the beginning; namely A the neutral mode of operation, 2 the combined mode of operation and C the alkaline mode of the operation. The novel mode of operation is shown in the shaded regions. The initial position is the region X, which represents the oxygen content and the pH value of the condensate after the ammonia dosing at the boiler inlet. Region Y shows the state of the low-pressure steam enriched with ammonia, and region Z shows that of the high-pressure feedwater enriched with oxygen.

The result of the separate addition of ammonia (31) upstream of the low-pressure drum 17, preferably into the feed line 33 downstream of the condensate pump 14, and of oxygen (32) downstream of the low-pressure drum 17, preferably upstream of the high-pressure feedpump 20, is that all parts of the plant are effectively protected. The specified water/steam quality is regulated via the dosed quantity of conditioning chemicals, the vacuum degassing in the condenser, and the desalting, described in connection with the purifying of the cycle, from the separator 25.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating a multi-pressure waste-heat boiler having at least one circulation steam generator including a low-pressure economizer, a low-pressure drum and a low-pressure evaporator, and at least one once-through steam generator, including a high-pressure economizer, a high-pressure evaporator and a high-pressure superheater, the method comprising the steps of:

introducing an amount of dissolved ammonia into condensate flowing into the circulation steam generator, said condensate having a pH value between 8.8 and 9.4, sufficient to obtain a pH of steam in the steam space of the low-pressure drum at a value between 9.4 and 9.7, and introducing an amount of gaseous oxygen into water flowing to the once-through steam generator sufficient to obtain an oxygen content in a range between 50 and 150 ppb at a pH value between 8.8 and 9.2.

2. A multi-pressure waste-heat boiler comprising at least one circulation steam generatorincluding a low-pressure economizer, a low-pressure drum and a low-pressure evaporator, and at least one once-through steam generator, including a high-pressure economizer fed by a line from the low-pressure drum, a high-pressure evaporator and a high-pressure superheater, means for introducing oxygen in the line between the low-pressure drum of the circulation steam generator and the high-pressure economizer of the once-through steam generator and means for introducing ammonia in a feed line leading to the circulation steam generator.

* * * * *